United States Patent [19]

Lebourg

[11] Patent Number: 5,247,923
[45] Date of Patent: Sep. 28, 1993

[54] METHOD OF FORMING A DIAMOND DRILL BIT ELEMENT USING LASER TRIMMING

[76] Inventor: Maurice P. Lebourg, 5592 Longmont, Houston, Tex. 77056

[21] Appl. No.: 831,559

[22] Filed: Mar. 9, 1992

[51] Int. Cl.$^5$ ............................ B28D 5/00; E21B 10/00
[52] U.S. Cl. .................................... 125/23.01; 125/39; 76/108.2; 76/DIG. 12; 219/121.72; 219/121.85
[58] Field of Search .................... 125/23.01, 30.01, 39; 76/101.1, 108.1, 108.2; 219/121.6, 121.67, 121.68, 121.69, 121.72, 121.73, 121.85

[56] References Cited

U.S. PATENT DOCUMENTS

| | | | |
|---|---|---|---|
| 2,199,692 | 5/1940 | Catland | 255/61 |
| 2,423,777 | 7/1947 | Jearum | 51/234 |
| 3,027,952 | 4/1962 | Brooks | 175/329 |
| 3,311,181 | 3/1967 | Fowler | 175/410 |
| 3,318,399 | 5/1967 | Garner | 175/329 |
| 3,527,198 | 9/1970 | Takaoka | 219/121.85 |
| 3,997,011 | 12/1976 | Staroba | 175/400 |
| 4,109,737 | 8/1978 | Bovenkerk | 175/329 |
| 4,254,840 | 3/1981 | Shay, Jr. | 175/410 |
| 4,373,593 | 2/1983 | Phaal et al. | 175/329 |
| 4,471,845 | 9/1984 | Jurgens | 175/329 |
| 4,546,231 | 10/1985 | Gresser et al. | 125/30.01 |
| 4,643,161 | 2/1987 | Kim | 125/30 |
| 4,697,654 | 10/1987 | Barr et al. | 175/410 |
| 4,716,976 | 1/1988 | Isakov | 175/410 |
| 4,858,706 | 8/1989 | Lebourg | 175/329 |
| 4,989,578 | 2/1991 | Lebourg | 125/23.01 |

OTHER PUBLICATIONS

Catalog entitled "Diamond Drilling," of Diamant Boart, place of pulbication unknown.
Catalog entitled "J-K-S Diamond Bits," of J-K-Smith & Sons Diamond Tools Ltd., place of publication unknown.

*Primary Examiner*—Roscoe V. Parker
*Attorney, Agent, or Firm*—Arnold, White & Durkee

[57] ABSTRACT

A method of forming a substantially hemispherically shaped diamond cutting element for use in a rotary drill bit is provided. A natural diamond is obtained and then cleaved to form a planar surface. A portion of the diamond is trimmed in the shape of a first truncated cone by directing a laser toward the planar surface from a predetermined angle and rotating the diamond in a circle about the central axis. The excess diamond produced by the trimming step is removed by directing the laser toward the diamond, from a direction substantially parallel to the planar surface, and rotating the diamond in a circle about the central axis. Then, a second truncated cone is created by directing a laser toward a lower portion of the first truncated cone from a predetermined angle and rotating the diamond in a circle about the central axis. If desired, the trimming and removing steps are alternately repeated, and the predetermined angle of the laser is successively adjusted. Thus, a series of truncated cones approximating a hemisphere is formed.

19 Claims, 8 Drawing Sheets

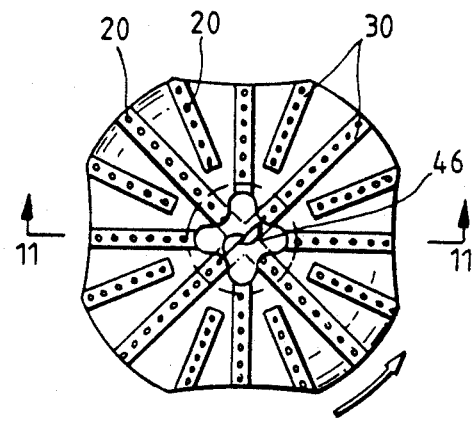
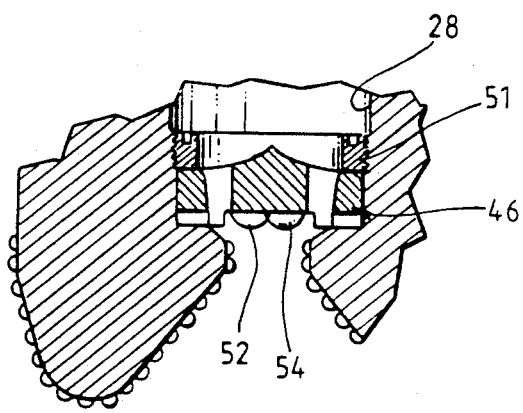
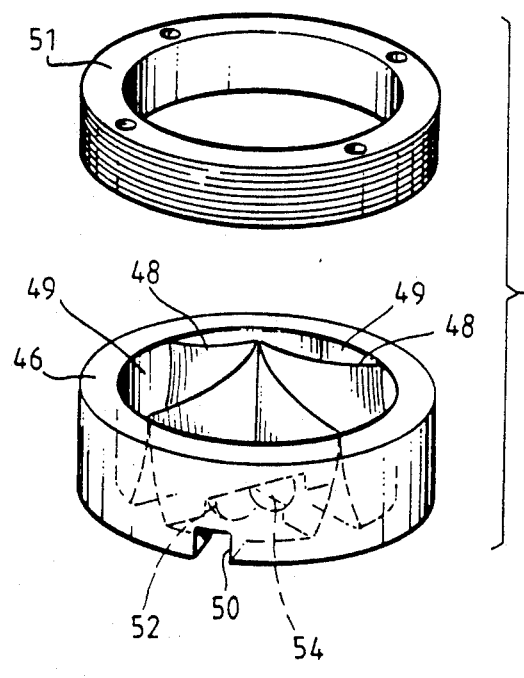
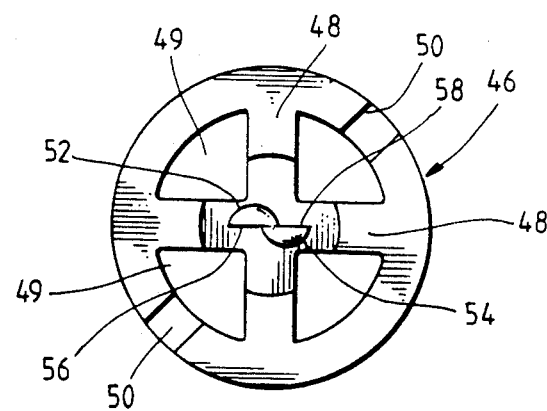

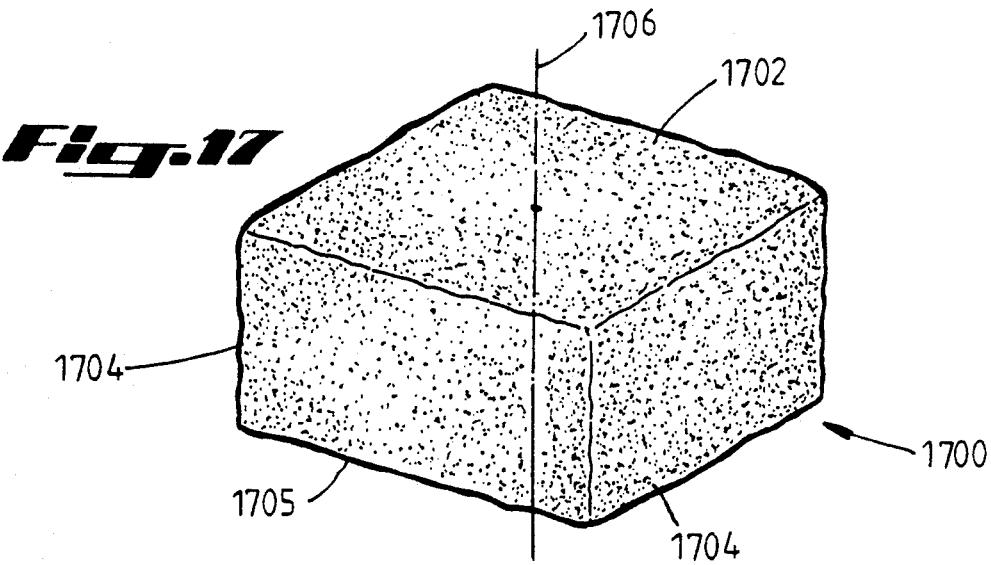
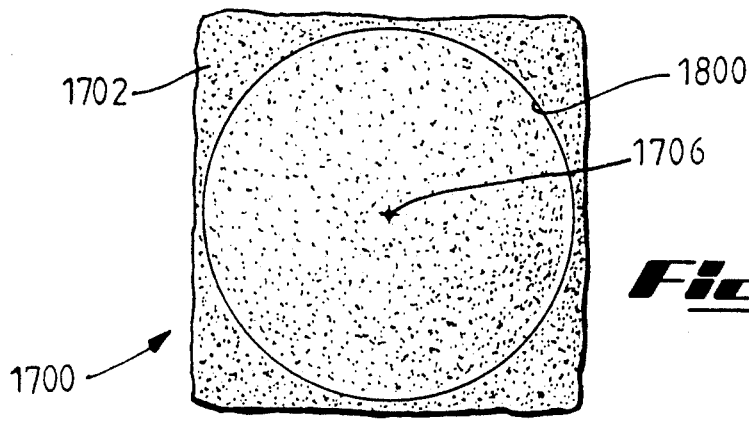
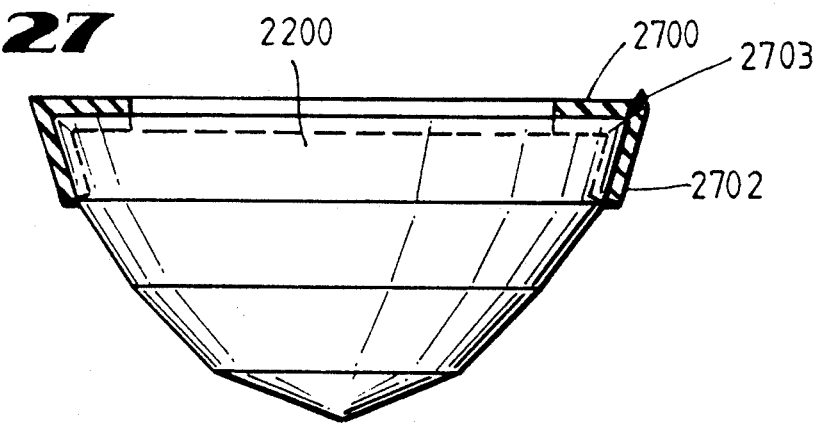

5,247,923

METHOD OF FORMING A DIAMOND DRILL BIT ELEMENT USING LASER TRIMMING

BACKGROUND OF THE INVENTION

The present invention relates to rotary drill bits for drilling boreholes into subterranean formations. More particularly, the invention relates to method of forming diamond elements for use in a rotary drill bit that utilizes diamond cutting elements.

Drill bits utilizing diamonds or similar hard cutting elements are commonly employed in drilling and coring operations, particularly in hard subterranean formations such as chert, quartzitic sandstones, and the like. The construction of such diamond drill bits usually includes a body portion having means for interconnection of the bit onto a drill string, and a matrix portion for mounting the diamonds or other cutting elements. Drilling fluid is directed down to the bottom of the borehole through the drill string and from a port generally disposed in the central portion of the bit. Fluid passageways or water courses that cross the drilling surfaces of the bit are provided to transport this drilling fluid across the bit face to cool and lubricate the drilling surface of the bit and to facilitate movement of drill cuttings from the drilling area.

The general theory of diamond bit operation is not simply to crush the formation and thereby make drilling progress, but rather to create tiny fractures as the cutting elements pass over the formation so that drilling fluid which is maintained at a higher pressure than the formation pressure, can enter these fractures and remove the fractured portions of the formation. While most diamond bits use this crushing or fracturing action to create the hole, some bits have been developed which utilize a shearing action to cut through the formation.

Many different types of "diamond" cutting elements have been developed and used. These include natural diamonds, synthetic diamonds, and composites which include combinations of diamonds with other compounds such as tungsten carbide. Additionally, many different types of diamond shapes have been used. These include natural round stones, mechanically and chemically rounded and polished stones, natural cubic stones, and natural octahedral stones. These stones have been inserted in many different configurations in diamond drill bits and in bits of many different shapes.

One method for forming diamond cutting elements for drill bits is disclosed in U.S. Pat. No. 4,989,578 which issued to the present applicant. Although the method shown in U.S. Pat. No. 4,989,578 is known to be entirely satisfactory for many applications, the drilling industry would also derive benefits from a method of forming diamond elements for drill bits using a laser.

SUMMARY OF THE INVENTION

The present invention comprises a method for forming a substantially hemispherical diamond cutting element for a drill bit. First, a natural diamond is obtained. Then, the diamond is cleaved or cut to form a planar surface, and a central axis perpendicular to the planar surface is identified. A first portion of the diamond is trimmed in the shape of a first truncated cone by directing a laser light source toward the planar surface from a predetermined angle and rotating the diamond in a circle about the central axis. A first scrap portion of the diamond, located exteriorly of the first truncated cone, is removed by directing the laser toward the diamond from a direction substantially parallel to the planar surface, and rotating the diamond in a circle about the central axis. A second portion of the diamond is trimmed by directing a laser toward a lower portion of the first truncated cone from a second predetermined angle and rotating the diamond in a circle about the central axis. A second scrap portion of the diamond, located exteriorly of the second truncated cone, is removed by directing the laser from a direction substantially parallel to the planar surface, and rotating the diamond in a circle about the central axis. The steps of trimming and removing are alternately repeated for a predetermined number of iterations, the predetermined angle being successively adjusted such that a series of truncated cones approximating a hemisphere is formed.

BRIEF DESCRIPTION OF THE DRAWINGS

The exact nature of the invention, as well as other objects and advantages thereof, will become apparent to those skilled in the art from consideration of the following detailed description in connection with the accompanying drawings, in which like reference numerals designate like parts throughout, wherein:

FIG. 10 is a plan view of the crown end of a second type of drill bit which may be utilized in conjunction with cutting elements formed by the method of the present invention.

FIG. 11 is a partial cross-sectional view of the bit of FIG. 10.

FIG. 12 is a perspective view of the center cutting element of the bit of FIGS 10 and 11.

FIG. 13 is a bottom plan view of the element of FIG. 12.

FIG. 17 is an isometric view of a cleaved diamond 1700.

FIG. 18 is a top plan view of a planar surface 1702 of the cleaved diamond 1700.

FIG. 27 is a side view of the cleaved diamond 1700, showing regions of the diamond 1700 that have been selectively finished in accordance with one preferred embodiment of the invention.

DETAILED DESCRIPTION OF THE PREFERRED EMBODIMENTS

The present invention provides a novel method for forming hemispherically shaped diamond cutting elements.

Figure 1:
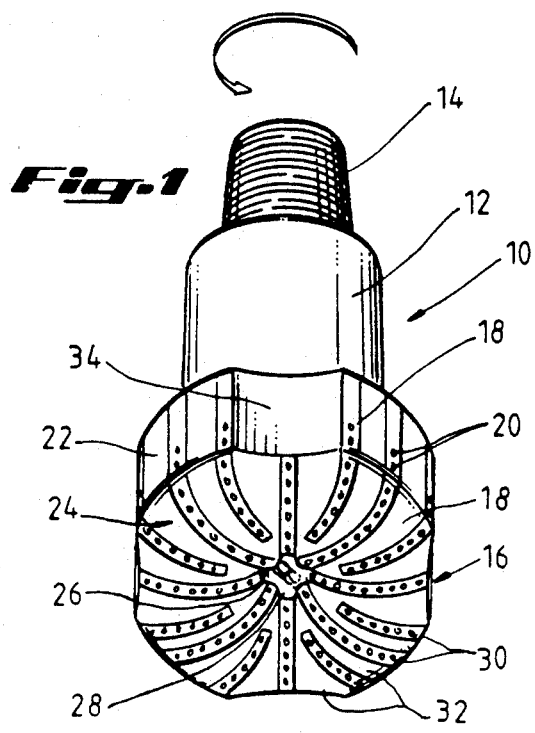
FIG. 1 is a perspective view of a first type of drill bit which may be utilized in conjunction with cutting elements formed by the method of the present invention.
Figure 2:
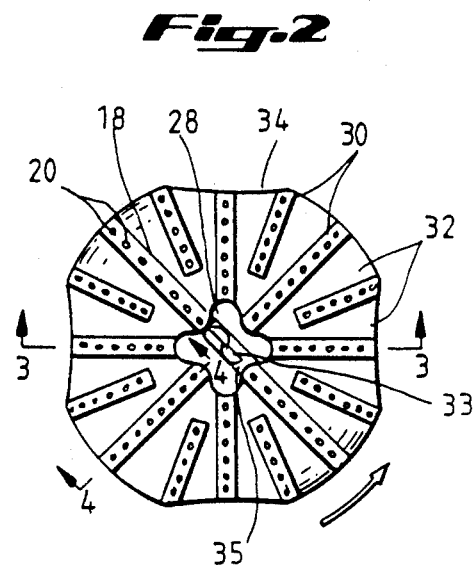
FIG. 2 is a plan view of the crown end of the drill bit of FIG. 1.

Reference is now made to the drawings, in which FIGS. 1 and 2 illustrate a drill bit 10, which comprises a body 12 formed of suitable material to withstand stress during operation. The upper portion of the body 12 is provided with an exteriorly threaded neck 14 so that the bit 10 may be interconnected at the bottom of a drill string. A lower body section or crown 16 of the bit 10 is surfaced with a metal matrix 18 in which diamond cutting elements 20 may be embedded. The matrix 18 is a relatively hard, tough material such as bronze, or a similar metal alloy such as a copper nickel alloy that contains powdered tungsten carbide in quantities sufficient to convey the required strength and erosion resistance. Alternatively, the matrix may be composed of a suitably hard plastic material capable of being cast upon the bit and having the properties of resisting wear and retaining the cutting elements. The material is of a suitable thickness to provide the required strength, resistance to erosion and abrasion, and to embed the diamond cutting elements firmly therein.

In casting the matrix material upon the bit body 12, it is common to provide recesses or a roughened surface on the bit body so that the matrix material will rigidly and firmly anchor to the bit body and form a permanent and fixed part of the drill bit.

In the embodiment illustrated in FIG. 1, the matrix 18 of the drill bit is shaped to have a generally semitoroidal end face defining an outer cylindrical gauge face 22, a lower, generally curved drilling face 24, and an interior coring face 26. The interior face 26 opens into a central passageway 28 extending through the bit body, and through which drilling fluid (not shown) is directed down the drill string to the formation and across the face of the bit. The matrix 18 is formed such that it has a plurality of fins 30 into which the diamond cutting elements 20 are embedded.

The fins 30 define a plurality of channels or water courses 32 which extend outwardly from the central passageway 28 in the interior face, across the drilling face 24 and up the gauge face 22 of the bit. Accordingly, drilling fluid delivered through the drill pipe through the passageway 28 is distributed through these flow passageways or water courses 32 to wash cuttings from the drilling area and upwardly to the top of the well as is well-known in the art. Additionally, in the embodiment illustrated, the matrix of the bit is provided with a series of junk slots 34 which are designed to discharge cuttings from the drilling area. It should be noted that a number of other configurations suitable for use in a diamond drilling bit would be obvious to those skilled in the art.

Figure 3:
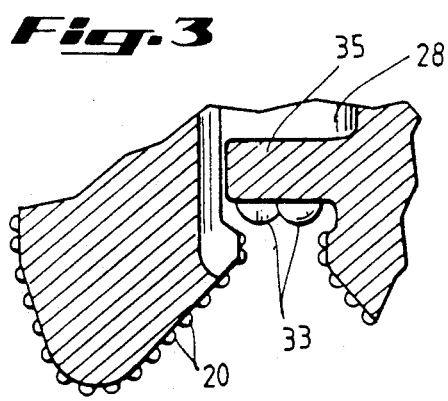
FIG. 3 is a partial cross-sectional view of the bit of FIGS. 1 and 2.

As can be best be seen in FIG. 3, a pair of hemispherically shaped diamond cutting elements 33 are placed on a projection 35 in the central passageway 28. The cutting elements 33 remove a core that is formed as the drilling face 24 progresses through the formation.

Reference is next made to FIGS. 4-9 which illustrate the manner in which the diamond cutting elements 20 are embedded in the matrix 18. The cutting elements 20 have a hemispherical shape and a planar surface 38 which may be formed by cleaving a diamond.

Figure 7:
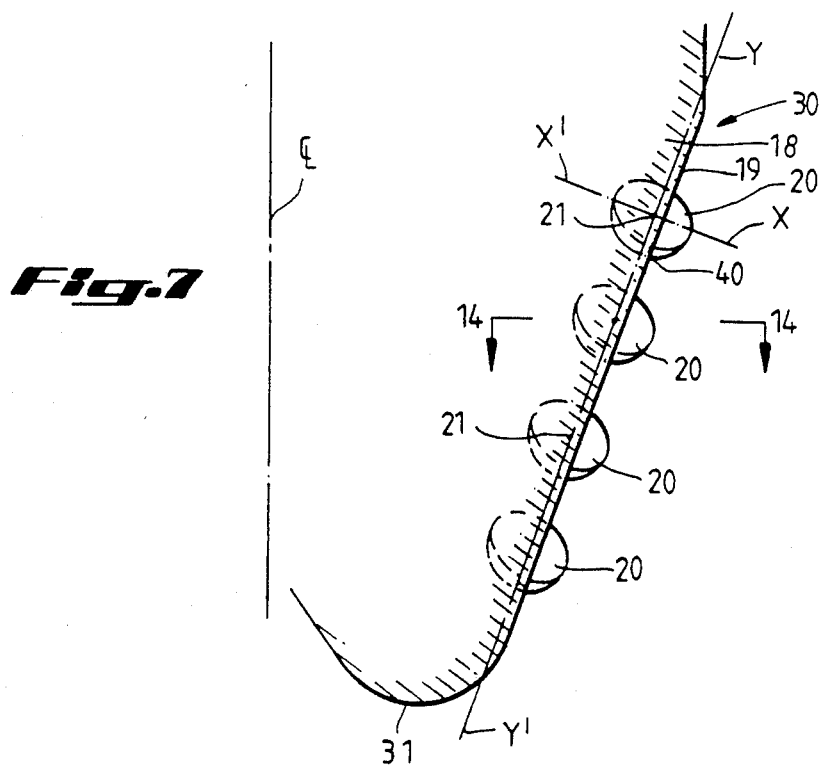
FIG. 7 is a schematic view illustrating the orientation of the diamond inserts in the matrix of the bit.
Figure 9:
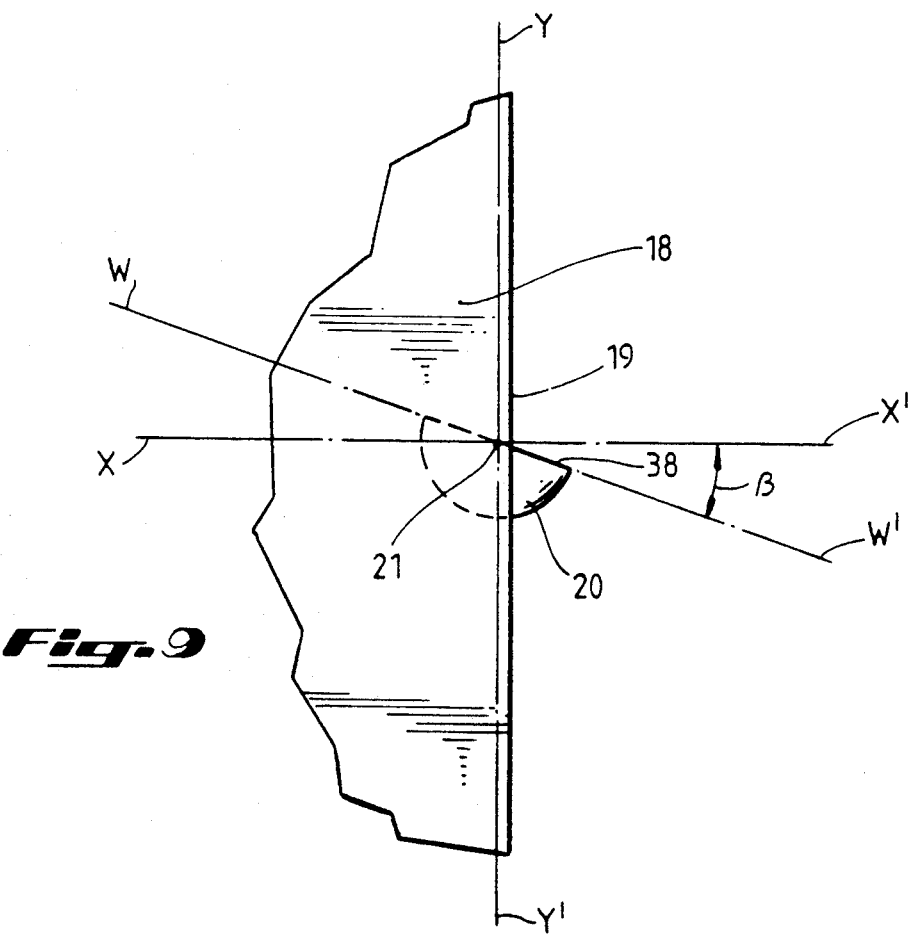
FIG. 9 is a schematic view illustrating the orientation of the diamond inserts in the matrix of the bit.

As can best be seen in FIGS. 7 and 9, the diamond cutting elements 20 are embedded in the matrix 18 such that the center 21 of each element 20 is behind the face 19 of the matrix 18. Accordingly, slightly over half of each cutting element 20 is embedded within the matrix 18 to ensure that the elements are securely fixed in place.

The diamond cutting elements 20 are oriented within the matrix 18 of fins 30 to provide the optimum cutting surface. Generally, the rounded surface of the cutting element 20 is oriented toward the lowermost tip 31 of the fin 30. The orientation of the elements 20 can best be seen with reference to FIGS. 6 and 7.

Figure 6:
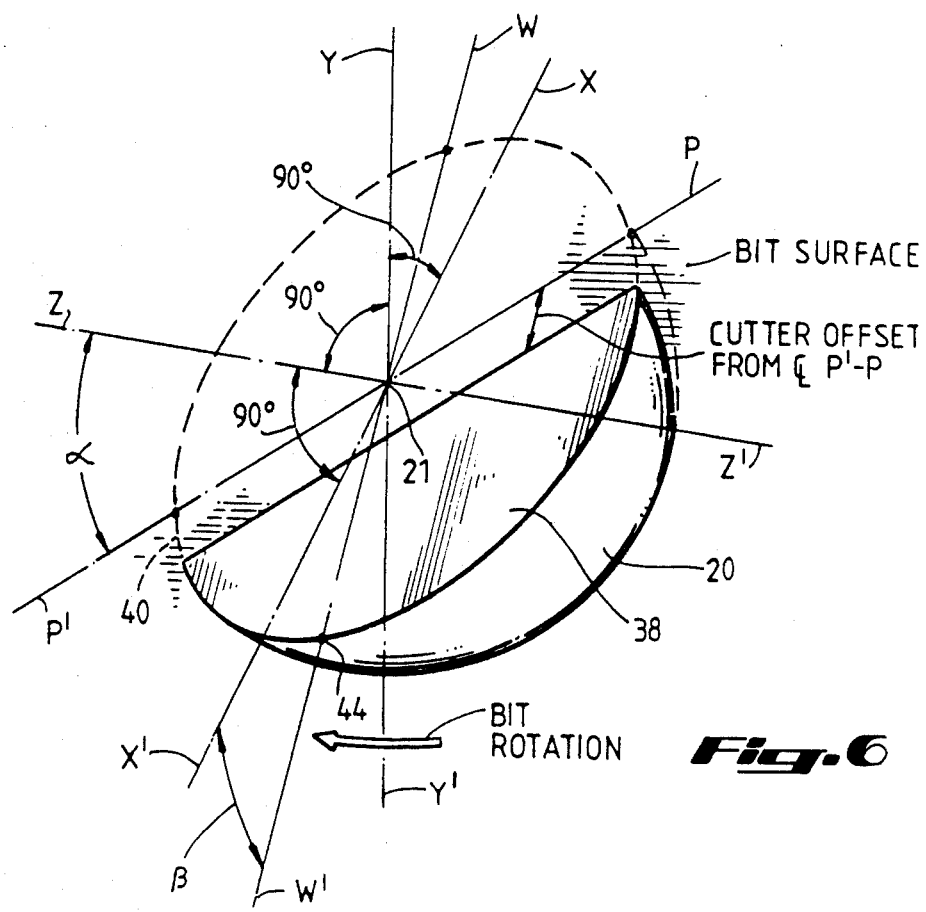
FIG. 6 is a schematic view illustrating the orientation of the diamond inserts in the matrix of the bit.

Illustrated in FIG. 6 are lines X-X', Y-Y' and Z-Z' which are oriented at 90 degrees to each other to define a three dimensional space and which intersect each other at a center 21 of the diamond element 20. The plane defined by lines Y-Y' and Z-Z' is parallel to the face 19 of the fin 30 with the line Y-Y' passing through the center 21 of the diamond element 20. It should be appreciated that while the line Y-Y' has been shown as a straight line for purposes of illustration in FIG. 7, it is parallel to the face 19 of the fin 30 and will be a curved line where the face 19 is curved. The line X-X' is perpendicular to the face 19 of the fin 30.

Figure 8:
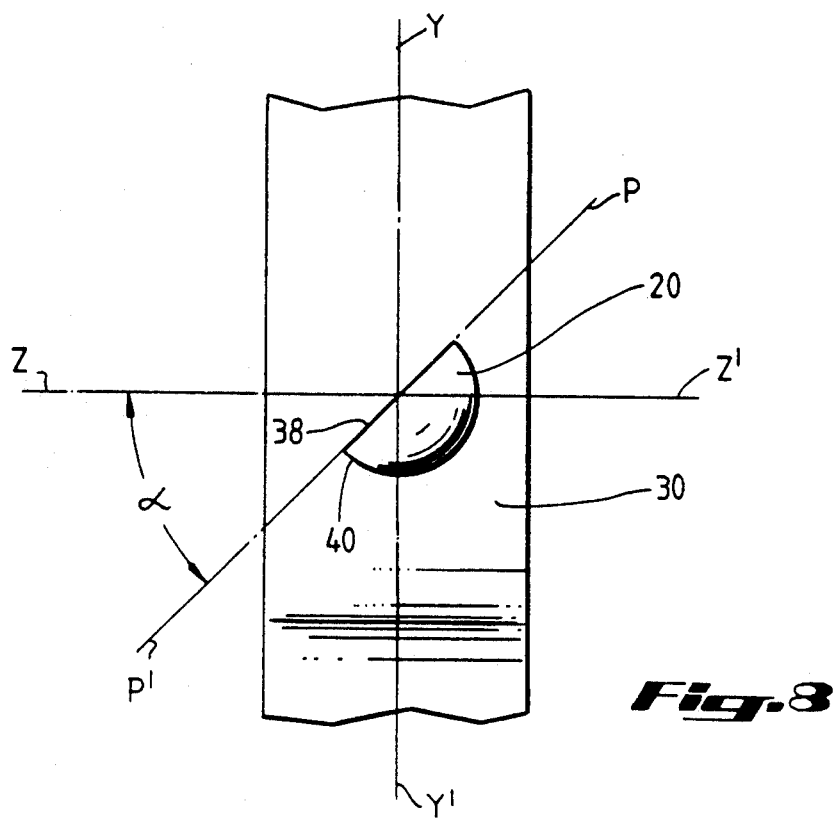
FIG. 8 is a schematic view illustrating the orientation of the diamond inserts in the matrix of the bit.

The flat or planar surface 38, which is defined by the cleaved face of the element 20, is rotated in two directions with respect to the plane defined by the lines X-X' and Z-Z'. First, as shown in FIG. 8, a leading edge 40 of the element 20 is inclined downward around the X-X' axis at a first angle α, as illustrated by the line P-P', to create a pitch. This permits the cutting element 20 to groove down into the rock formations. The angle α can be increased or decreased depending upon the type of formation in which the bit will be used. Generally, the angle α is within the range of 30-60 degrees. Preferably, the angle α is about 45 degrees.

An outer edge 44 of the diamond cutting element 20 is also inclined downward around the P-P' axis from a plane defined by the lines X-X' and P-P' at a second angle β, as illustrated by line W-W' in FIG. 9. This downward inclination exposes the sharp cutting edge 44 and the planar surface 38 of the cutting element 20 to the formation being drilled. If the angle β is formed before the angle α, the rotation occurs around the Z-Z' axis as illustrated in FIG. 9. Angle β can also be adjusted within a suitable range depending upon the size of the cutting element and the hardness of the formation in which the bit 10 will be used. Generally, the angle β is within the range of 15-30 degrees. Preferably, the angle β is about 30 degrees.

As can be seen from the foregoing, the lines P-P' and W-W' define the planar surface 38 of the element 20. This plane is rotated in two directions from the plane defined by the lines X-X' and Z-Z' if the angle β is created first. Otherwise, the angle β is measured from the plane defined by the lines X-X' and P-P'.

Figure 4:
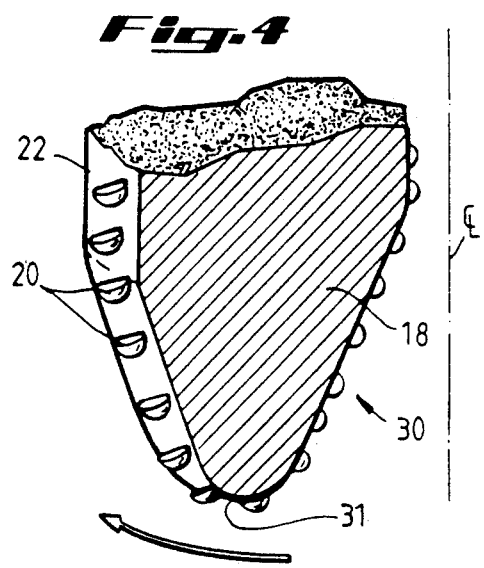
FIG. 4 is a first perspective view of a slice of the bit illustrated in FIGS. 1 and 2.
Figure 5:
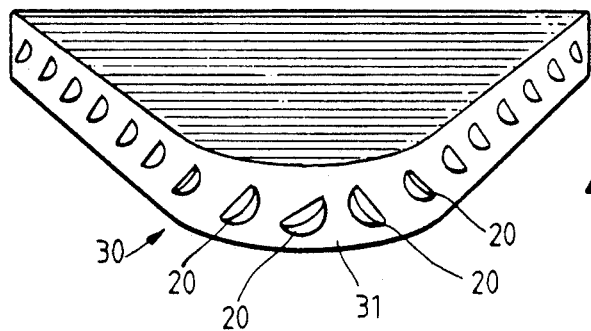
FIG. 5 is a second perspective view of a slice of the bit illustrated in FIGS. 1 and 2.

As can be seen in FIGS. 4 and 5, the orientation of diamond cutting elements changes as they progress from the outer face to the interior face of the bit 10. The greatest change occurs adjacent to the lowermost tip 31 of the fin 30.

Reference is next made to another drill bit embodiment shown in FIGS. 10-13, wherein the fins 30 are substantially identical to the arrangement shown in the embodiment of FIGS. 1 and 2. A core cutting insert 46 is provided at the center of the central passageway 28 to remove the core which is left as the formation is being drilled. The core cutting insert 46 is generally disk shaped with crossbars 48 and openings 49 formed in the center thereof. The insert 46 is positioned in the central passageway 28 and is secured in place by a threaded ring 51. The openings 49 permit drilling fluid (not shown) to pass through the insert 46 to clean and lubricate the face of the bit 10. The upper edges of crossbars 48 are tapered to create as little turbulence as possible as the fluid passes through the openings 49.

A pair of notches 50 are formed in the bottom of the insert 46 to permit easy alignment of the insert 46 within the central passageway 28. The notches 50 also help prevent rotation of the insert 46 within the bit 10.

A pair of diamond cutting elements 52 and 54 are positioned in the crossbars 48 for removing the core. The diamond cutting elements 52 and 54 are generally hemispherical in shape. Flat faces 56 and 58 of elements 52 and 54 are positioned such that they face each other. However, the elements 52 and 54 are offset such that they only slightly overlap each other. When the diamond cutting elements 52 and 54 become worn or break, the insert 46 can easily be removed and replaced. Because the core is not supported, it is easily destructed in small fragments without retarding the penetration of the bit.

Figure 14:
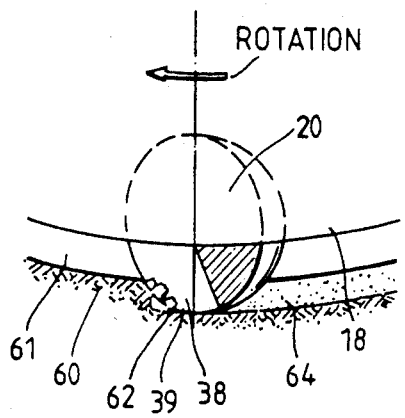
FIG. 14 is a cross-sectional view taken along line 10—10 of FIG. 7 showing the grooving action of the diamond inserts of the present invention.

Reference is next made to FIG. 14 which illustrates the cutting and grooving action of the diamond cutting elements 20. As the planar surface 38 of the cutting element 20 engages a rock formation 60, it fractures and grooves the rock, thus forming pieces 62 which are carried away by the drilling fluid. A groove 64 is formed in the rock formation 60 by the cutting action of the element 20. As can further be seen in FIG. 14, only an outer portion 39 of element 20 engages rock formation 60. Accordingly, a space 61 remains between matrix 18 of the bit and rock formation 60. This provides a passageway for removal of chipped rock.

Figure 15:
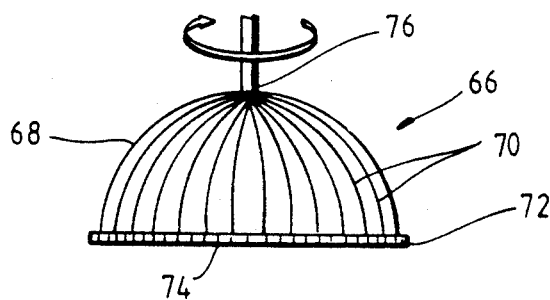
FIG. 15 is a plan view of a tool used to form a mold for casting a bit in accordance with the present invention.

FIG. 15 illustrates a tool 66 which can be used in the formation of a mold for casting the bit 10. Generally, diamond bits are formed by mounting the diamonds in a graphite mold which is then filled with a metal powder that is sintered to form the matrix which holds the diamonds. The tool 66 includes a hemispherically shaped body 68 which is covered with a plurality of cutting blades 70. A ring 72, also covered with cutting blades, is formed adjacent to a planar face 74 of the body 68.

The body 68 is mounted on a shaft 76 for attachment to a suitable mill. The tool 66 is rotated by the mill and cuts a portion of a hemispherically shaped hole in the graphite mold, into which the diamond cutting elements 20 can be mounted. Since the edge of the body 68 adjacent the planar face 74 tends to wear first, the ring 72 is provided to create a slightly larger opening adjacent to the planar face. This ensures that the hole created by the tool 66 is properly sized to receive the diamond cutting element 20, especially the sharp edge adjacent the cleaved face.

Figure 16:
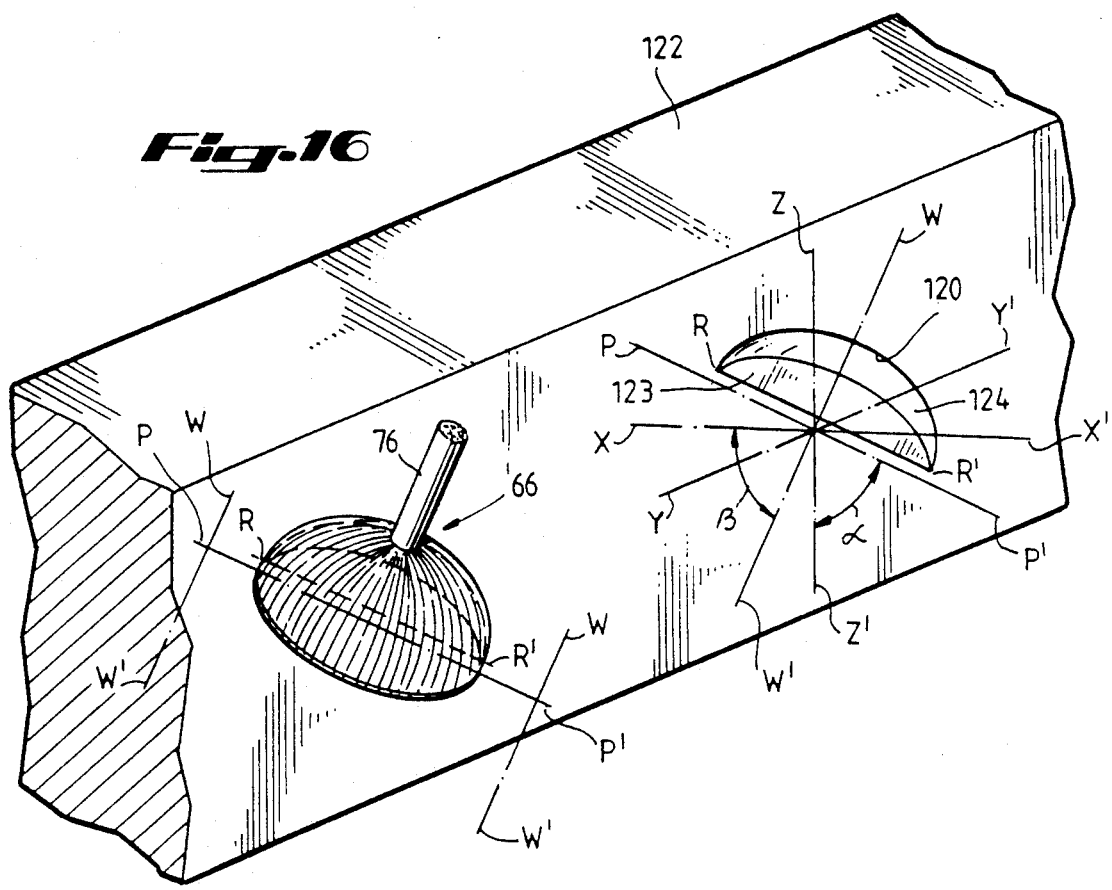
FIG. 16 is a perspective view of a portion of a mold showing the formation of holes to receive a diamond insert.

FIG. 16 illustrates the cutting of holes 120 in a mold 122 using the tool 66. The mold 122 corresponds to the face of a fin 30. The shaft 76 of the tool 66 is attached to a suitable mill which can be programmed to cut holes 120 having a planar surface 123 corresponding to the planar surface 38 of the diamond inserts and a concave surface 124 corresponding to the curved portion of the hemispherically diamond inserts. The axes of the hole 120 are shown by the lines X-X', Y-Y', Z-Z', P-P' and W-W' which correspond to the axes illustrated in FIG. 6.

As the tool 66 cuts the holes 120, it moves along a plane defined by the lines P-P' and W-W'. Methods of clamping the mold 122 and programming a suitable mill are well known to those skilled in the art. After cutting the holes 120, the cleaved plane 98 of the hemisphere 101 is positioned along planar surface 123 of hole 120, and the hemisphere 101 is glued into hole 120 to secure it in place while matrix 18 is being formed.

Reference is now made to FIGS. 17-23 which illustrate the preferred embodiment of the invention, wherein a laser trimming procedure is used to form hemispherical inserts suitable for use in drill bits such as those described hereinabove. It is understood that this procedure can be performed on diamonds of an unlimited variety of shapes, as long as the original diamonds are at least as large as the desired hemispherical inserts. For ease of understanding, however, FIGS. 17-23 will describe this procedure in conjunction with a rough diamond 1700 having generally rectangular faces.

The diamond 1700 is first cleaved, trimmed with a laser, or otherwise cut, to form a planar surface 1702. The resulting cleaved diamond 1700 has four sides 1704 which are generally perpendicular to the planar surface 1702, and a bottom 1705 which is generally parallel to the planar surface 1702. A central axis 1706 of the diamond 1700 is then identified, the axis 1706 being perpendicular to the planar surface 1702, and running generally through the diamond's center.

Figure 19:
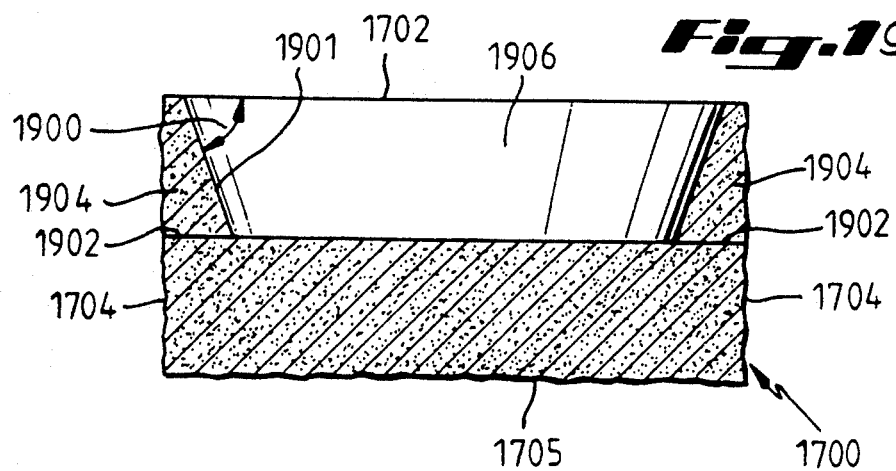
FIG. 19 is a cutaway side view of the cleaved diamond 1700 showing the creation of a truncated cone 1906 in accordance with one preferred embodiment of the invention.

As shown in FIG. 18, a circle 1800 on the planar surface 1702 is then identified. The radius of the circle 1700 is equal to that of the radius of the desired hemispherical insert. Referring now to FIGS. 18 and 19, a laser beam (not shown) is then directed toward a spot on the circumference of the circle 1700, from a predetermined angle 1900 measured with respect to the planar surface 1702. The laser used in this procedure is understood to be one having sufficient power to penetrate and cut diamond materials.

The diamond 1700 is then rotated about the central axis 1706, causing the laser beam to cut a circular channel in the planar surface 1702, the channel having an opening coincident with the circle 1800. This channel is shown most clearly in FIG. 19, as indicated by reference numeral 1901.

Next, the laser beam is directed toward the diamond 1700 from an angle substantially parallel to the planar surface 1702, and the diamond 1700 is rotated about the central axis 1706. This results in the creation of a channel 1902 in the sides 1704 of the diamond. A scrap region 1904 is thus defined by channels 1901 and 1902. The region 1904 can be cut with a laser beam or otherwise cleaved to remove it from the diamond 1700. After removal of the region 1904, it can be seen that the channel 1901 defines a first truncated cone 1906.

Figure 20:
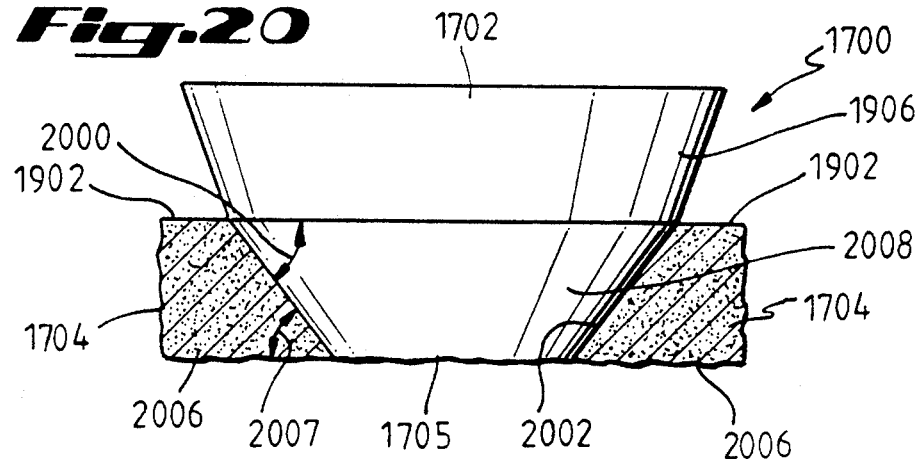
FIG. 20 is a side view of the cleaved diamond 1700 showing the creation of a truncated cone 2008 in accordance with one preferred embodiment of the invention.

The laser beam is then directed toward a spot on the truncated cone 1906 near the intersection of channels 1901 and 1902 from a predetermined angle 2000, as shown in FIG. 20. The second angle 2000 is less than the first angle 1900. By rotating the diamond 1700 about the central axis 1706, a circular channel 2002 is created.

Figure 21:
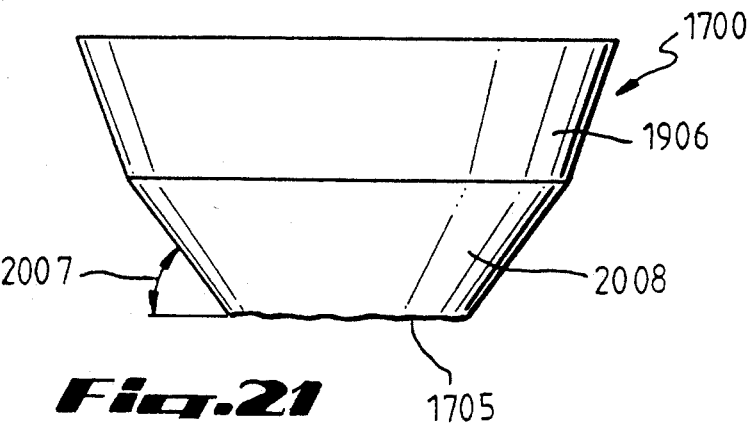
FIG. 21 is a side view of the cleaved diamond 1700 showing the truncated cones 1906 and 2008, created in accordance with one preferred embodiment of the invention.

A scrap region 2006 is created by the channel 2002. Upon removal of the region 2006 it can be seen that the channel 2002 has created a second truncated cone 2008. Thus, as shown in FIG. 21, a diamond 1700 having two truncated cones 1906 and 2008 generally approximating a hemisphere is formed.

Alternatively, instead of creating the second truncated cone 2008 by directing the laser toward a spot on the truncated cone 1906 near the intersection of channels 1901 and 1902, the laser can be directed toward the bottom 1705 of the diamond 1700 at a predetermined angle 2007 to create the truncated cone 2008.

In an alternate preferred embodiment of the invention, the above-described procedure is generally employed with several modifications. Specifically, a greater number of truncated cones are created to more closely approximate a hemisphere. This procedure will now be described in greater detail with reference to FIGS. 22-24.

By creating channels (not shown) of lesser depth than the channels 1901 and 2002, a greater number of truncated cones can be created in the diamond 1700. For example, as shown in FIG. 24, a diamond 1700 with a series of four truncated cones 2200, 2300, 400, and 2402 can be created.

Figure 22:
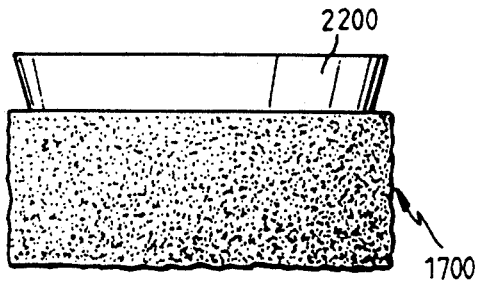
FIG. 22 is a cutaway side view of the cleaved diamond 1700 showing a truncated cone 2200, created in accordance with one preferred embodiment of the invention.
Figure 23:
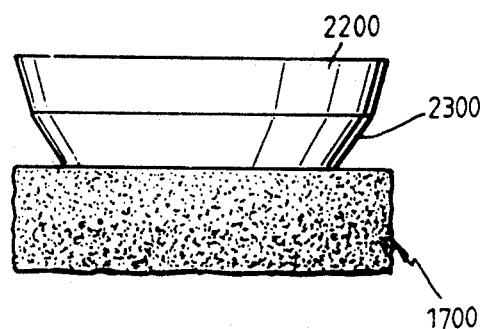
FIG. 23 is a cutaway side view of the cleaved diamond 1700 showing the truncated cones 2200 and 2300, created in accordance with one preferred embodiment of the invention.
Figure 24:
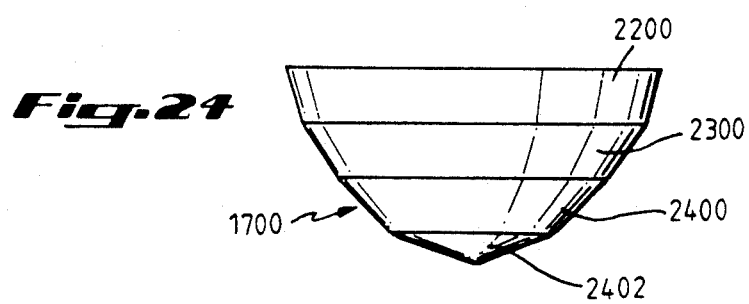
FIG. 24 is a side view of the cleaved diamond 1700 showing the truncated cones 2200, 2300, 2400, and 2402, created in accordance with one preferred embodiment of the invention.
Figure 25:
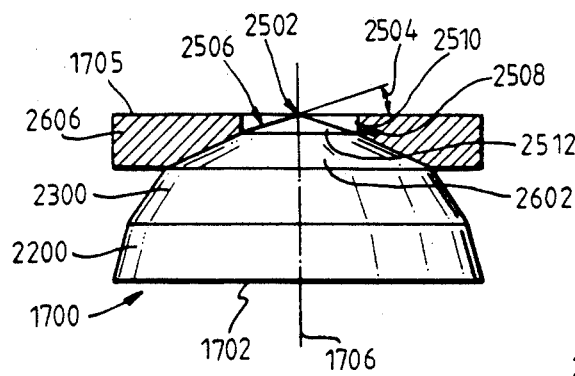
FIG. 25 is a cutaway side view of the cleaved diamond 1700 showing the creation of the truncated cone 2512 in accordance with one preferred embodiment of the invention.

In another alternate preferred embodiment of the invention, the procedure illustrated in FIGS. 22-24 is generally employed with several modifications. First, the truncated cones 2200 and 2300 are created utilizing the procedure described hereinabove and shown in FIGS. 22-24. However, rather than creating the truncated cones 400 and 2402 with these same procedures, an alternate method is used. Referring to FIG. 25, the diamond is turned upside-down so that the laser can be directed onto the bottom 1705 of the diamond 1700.

The laser is then directed toward a spot 2502 where the central axis 1706 intersects the bottom 1705, the laser being directed from a predetermined angle 2504. The diamond 1700 is then rotated about the central axis 1706, causing the laser beam to cut a conical channel 2506 in the diamond 1700.

Then, the laser is directed at the bottom 1705 from an angle substantially perpendicular to the planar surface 1702, and the diamond 1700 is rotated about the central axis 1706. This results in the creation of a circular channel 2508 in the bottom 1705. A scrap region 2510, which is defined and separated from the diamond 700 by the channels 2506 and 2508, is subsequently removed from the diamond 1700. After extracting the region 2510, it can be seen that the channel 2506 defines a truncated cone 2512.

Figure 26:
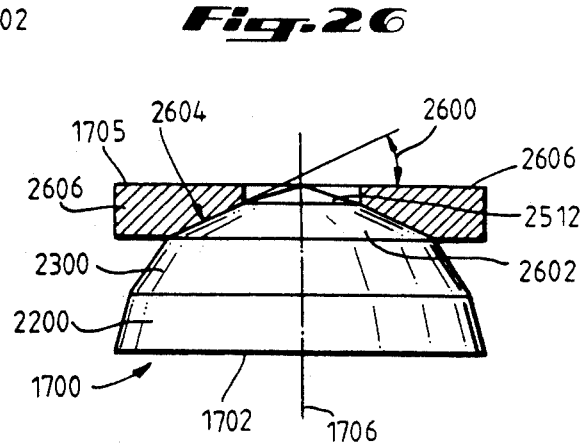
FIG. 26 is a cutaway side view of the cleaved diamond 1700 showing the creation of the truncated cone 2602 in accordance with one preferred embodiment of the invention.

Referring to FIG. 26, the laser beam is then directed toward the truncated cone 2512 near the intersection of the channels 2506 and 2508, from a predetermined angle 2600. The angle 2600 is greater than the angle 2504. The diamond 1700 is rotated about the central axis 1706, thereby creating a channel 2604 which separates a scrap region 2606 from the diamond 1700. Thus, a series of truncated cones 2200, 2300, 2512, and 2602 approximating a hemisphere are formed.

It is contemplated that the steps involved in the embodiment illustrated in FIGS. 22-26 can modified in a number of ways without departing from the scope of the invention. Specifically, the number of truncated cones created by the method of FIGS. 22-24 can be increased or decreased, and the number of truncated cones created using the method of FIGS. 25-26 can be decreased or increased accordingly. For instance, one application of such a modification involves utilizing the method of FIGS. 22-24 to create the truncated cones 2200, 2300, and 2400, turning the diamond 1700 upside-down, and then utilizing the steps illustrated in FIG. 25 to create the truncated cone 2512.

While the embodiments of the invention described hereinabove involve rotating the diamond 1700 during the cutting of t e truncated cones, it is understood that an alternative method involves rotating the laser in a circular path about the central axis 1706 during the cutting of the truncated cones, rather than rotating the diamond.

Furthermore, while the laser trimming embodiments illustrated in FIGS. 22-26 show four truncated cones, it will be appreciated by those skilled in the art that the number of cones can be increased or decreased, and the predetermined angle of each section can be varied. A determination of the numbers and angles for a particular application is within the ability possessed by one of ordinary skill in the related art, having the benefit of this disclosure.

After forming a series of truncated cones by any of the methods described above, selected regions of the diamond 1700 are then polished for reasons described hereinbelow. FIG. 27 illustrates a preferred method for polishing the diamond 1700. First, a region 2700 of the planar surface 1702 is polished using conventional diamond polishing methods that are well-known by ordinarily skilled artisans. This region 2700 is ring-shaped (not shown) when viewed from above the planar surface 1702.

Then, an outer strip 2702 of the first truncated cone 2200 is polished. By polishing the regions 2700 and 2702, a sharp cutting edge 2703 is provided. It is contemplated that when the cutting edge 2703 becomes dull from use, the diamond 1700 can be removed, rotated about its central axis 1706, and replaced, to ensure that a sharp portion of the cutting edge 2703 is exposed.

As can be seen from the foregoing, the present invention provides a novel laser trimming method to create hemispherically shaped diamond inserts having planar faces 1702, for use as cutting elements. The inserts may be positioned in a drill bit design such as the bit 10 to provide faster penetration rates than other types of diamond drilling bits.

While the invention has been described with respect to the presently preferred embodiments, it will be appreciated that changes and modifications can be made without departing from the scope or essential characteristics of the invention. Accordingly, the scope of the invention is defined by the appended claims rather than by the foregoing description. All changes or modifications which come within the meaning and range of equivalency of the claims are to be embraced within their scope.

I claim:

1. A method for forming a substantially hemispherical diamond cutting element for a drill bit, comprising:
   obtaining a natural diamond;
   forming a planar surface on the diamond substantially parallel to a cleaving plane of the diamond;
   identifying a central axis perpendicular to the surface;
   trimming a first portion of the diamond in the shape of a first truncated cone by directing a laser toward the planar surface from a first predetermined angle and rotating the laser relative to the diamond in a circle about the central axis;
   removing a portion of the diamond located exteriorly of the first truncated cone;
   trimming a second portion of the diamond in the shape of a second truncated cone by directing the laser toward a predetermined position on the previously-created truncated cone from a second predetermined angle and rotating the laser relative to the diamond in a circle about the central axis; and
   removing a portion of the diamond located exteriorly of the second truncated cone.

2. The method of claim 1, wherein the removing step comprises directing the laser toward the diamond from a direction substantially parallel to the planar surface, and rotating the laser relative to the diamond in a circle about the central axis.

3. The method of claim 1, wherein the removing step comprises directing the laser toward the diamond from a direction substantially parallel to the planar surface, and rotating the diamond in a circle about the central axis.

4. The method of claim 1, wherein the removing step comprises cleaving the portion to be removed.

5. The method of claim 1, further comprising the steps of alternately repeating the step of trimming a portion of the diamond to form a truncated core and the step of removing the portion of the diamond located exteriorly of the truncated cone for a predetermined number of iterations, wherein the predetermined angle is successively adjusted such that the a series of truncated cones approximating a hemisphere is formed.

6. The method of claim 1, further comprising the steps of:
   polishing a ring-shaped region defined on the planar surface, the region having an outer dimension equal to the outer perimeter of the planar surface and an inner dimension equal to a circle of predetermined radius defined on the planar surface; and
   polishing a section of the first truncated cone adjacent to the planar surface to form a sharp cutting edge around the periphery of the planar surface.

7. A method for forming a substantially hemispherical diamond cutting element for a drill bit, comprising the following steps:
   obtaining a natural diamond;
   forming a planar surface on the diamond substantially parallel to a cleaving plane of said diamond;
   identifying a central axis perpendicular to the surface;
   trimming a first portion of the diamond in the shape of a first truncated cone by directing a laser toward the planar surface from a first predetermined angle and rotating the diamond about the central axis;
   removing a portion of the diamond located exteriorly of the first truncated cone;
   trimming a second portion of the diamond to form a second truncated cone by directing the laser toward a predetermined position on the previously created truncated cone from a second predetermined angle and rotating the diamond about the central axis; and
   removing a portion of the diamond located exteriorly of the second truncated cone.

8. The method of claim 7, wherein the removing step comprises directing the laser toward the diamond from a direction substantially parallel to the planar surface, and rotating the laser relative to the diamond in a circle about the central axis.

9. The method of claim 7, wherein the removing step comprises directing the laser toward the diamond from a direction substantially parallel to the planar surface, and rotating the diamond in a circle about the central axis.

10. The method of claim 7, wherein the removing step comprises cleaving the portion to be removed.

11. The method of claim 7, further comprising the steps of alternately repeating the step of trimming a portion of the diamond to form a truncated cone and the step of removing the portion of the diamond located exteriorly of the truncated cone for a predetermined number of iterations, wherein the predetermined angle is successively adjusted such that the a series of truncated cones approximating a hemisphere is formed.

12. The method of claim 7, further comprising the steps of:
   polishing a ring-shaped region defined on the planar surface, the region having an outer dimension equal to the outer perimeter of the planar surface and an inner dimension equal to a circle of predetermined radius defined on the planar surface; and
   polishing a section of the first truncated cone adjacent to the planar surface to form a sharp cutting edge around the periphery of the planar surface.

13. A method for forming a substantially hemispherical diamond cutting element for a drill bit, comprising the steps of:
   obtaining a natural diamond;
   forming a planar surface on the diamond substantially parallel to a cleaving plane of the diamond;
   identifying a central axis perpendicular to the surface;
   successively trimming one or more contiguous portions of the diamond into truncated cone shapes, wherein the truncated cone shape created first has a base located adjacent to the planar surface, by performing the following steps one or more times:
      directing a laser toward the diamond from a predetermined angle while rotating the laser relative to the diamond in a circle about the central axis;
   removing a portion of the diamond located exteriorly of the most-recently-created truncated cone; and adjusting the predetermined angle.

14. The method of claim 13, wherein the removing step comprises directing the laser toward the diamond from a direction substantially parallel to the planar surface, and rotating the laser relative to the diamond in a circle about the central axis.

15. The method of claim 13, wherein the removing step comprises a step of directing the laser toward the diamond from a direction substantially parallel to the planar surface, and rotating the diamond in a circle about the central axis.

16. The method of claim 13, wherein the removing step comprises a step of cleaving the portion to be removed.

17. The method of claim 13, further comprising the steps of successively trimming one or more contiguous portions of the diamond into truncated cone shapes, wherein the truncated cone shape created first is adjacent to a side of the diamond opposite the planar surface, by performing the following steps one or more times:
- directing the laser from a predetermined angle toward the intersection between the central axis and the opposite side while rotating the laser relative to the diamond in a circle about the central axis;
- extracting a portion of the diamond located exteriorly of the most-recently-created truncated cone; and
- adjusting the predetermined angle.

18. The method of claim 13, further comprising the steps of successively trimming one or more contiguous portions of the diamond into truncated cone shapes, wherein the truncated cone shape created next is adjacent to a side of the diamond opposite the planar surface, by performing the following steps one or more times:
- directing the laser from a predetermined angle toward the intersection between the central axis and the opposite side while rotating the diamond in a circle about the central axis;
- extracting a portion of the diamond located exteriorly of the most-recently-created truncated cone; and
- adjusting the predetermined angle.

19. The method of claim 13, further comprising the steps of:
- polishing a ring-shaped region defined on the planar surface, the region having an outer dimension equal to the outer perimeter of the planar surface and an inner dimension equal to a circle of predetermined radius defined on the planar surface; and
- polishing a section of the truncated cone located adjacent to the planar surface.

* * * * *